US008923611B2

(12) United States Patent
Carpenter

(10) Patent No.: US 8,923,611 B2
(45) Date of Patent: *Dec. 30, 2014

(54) AUTOMATIC BACKGROUND IDENTIFICATION IN VIDEO IMAGES

(71) Applicant: Google Inc., Mountain View, CA (US)

(72) Inventor: Thor Carpenter, Snoqualmie, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/070,412

(22) Filed: Nov. 1, 2013

(65) Prior Publication Data

US 2014/0056515 A1 Feb. 27, 2014

Related U.S. Application Data

(63) Continuation of application No. 13/349,217, filed on Jan. 12, 2012, now Pat. No. 8,594,423.

(51) Int. Cl.
*G06K 9/62* (2006.01)
*G06K 9/34* (2006.01)
*G06T 7/00* (2006.01)

(52) U.S. Cl.
CPC ............... *G06K 9/6212* (2013.01); *G06K 9/34* (2013.01); *G06T 7/0081* (2013.01); *G06T 7/0087* (2013.01); *G06T 2207/10016* (2013.01); *G06T 2207/10024* (2013.01); *G06T 2207/20076* (2013.01); *G06T 2207/20144* (2013.01); *G06T 2207/20148* (2013.01)
USPC ........... 382/164; 382/168; 382/171; 382/173; 382/118; 382/103

(58) Field of Classification Search
USPC ......... 382/107, 171, 168, 164, 173, 118, 103, 382/154, 228, 224; 358/453; 345/156, 158; 375/240.01
See application file for complete search history.

(56) References Cited

U.S. PATENT DOCUMENTS

| 6,912,313 | B2 | 6/2005 | Baoxin |
| 7,720,283 | B2 | 5/2010 | Sun |
| 2004/0002838 | A1 * | 1/2004 | Oliver et al. ...................... 703/2 |
| 2008/0181507 | A1 | 7/2008 | Gope |
| 2009/0046776 | A1 | 2/2009 | Au |
| 2010/0135541 | A1 | 6/2010 | Lai |
| 2012/0015825 | A1 * | 1/2012 | Zhong et al. ...................... 506/6 |
| 2013/0129205 | A1 * | 5/2013 | Wang et al. ................... 382/164 |

* cited by examiner

*Primary Examiner* — Ali Bayat
(74) *Attorney, Agent, or Firm* — Fish & Richardson P.C.

(57) ABSTRACT

Methods and systems are provided allowing for background identification in video images. A computer-implemented image processing method includes: receiving, using at least one processing circuit, a plurality of image frames of a video; constructing, using at least one processing circuit, a plurality of statistical models of the plurality of image frames at a plurality of pixel granularity levels; constructing, using at least one processing circuit, a plurality of probabilistic models of an input image frame at a plurality of channel granularity levels based on the plurality of statistical models; merging at least some of the plurality of probabilistic models based on a weighted average to form a single probability image; and determining background pixels, based on a probability threshold value, from the single probability image.

13 Claims, 7 Drawing Sheets

AUTOMATIC BACKGROUND IDENTIFICATION IN VIDEO IMAGES

CROSS REFERENCE TO RELATED APPLICATION

The present application is a continuation of U.S. patent application Ser. No. 13/349,217, filed on Jan. 12, 2012, which is hereby incorporated by reference in its entirety.

BACKGROUND

This specification relates generally to image processing, and particularly to video image processing.

The Internet provides access to a wide variety of resources, such as video files, audio files, pictures, business and personnel contact information, product information, maps, and news articles. Although textual data were prevalent during early days of the Internet, video file transfers and video communications are becoming more popular with the increase in bandwidth.

SUMMARY

In one aspect, a computer-implemented image processing method includes: receiving, using at least one processing circuit, a plurality of image frames of a video, wherein each pixel of each of the plurality of image frames has a blue channel, a green channel, a red channel, and an alpha channel; constructing, using at least one processing circuit, a plurality of statistical models of the plurality of image frames at a plurality of pixel granularity levels, the plurality of statistical models including: at a first pixel granularity level, a spatio-temporal (S-T) histogram for each of the pixels from the plurality of image frames, wherein a first axis of the S-T histogram represents channel value bins, and wherein a second axis of the S-T histogram represents counts of image frames per bin; at a second pixel granularity level higher than the first pixel granularity level, aggregate histograms for the blue, green, and red channels, respectively, based on aggregated pixel values at the second pixel granularity level; constructing, using at least one processing circuit, a plurality of probabilistic models of an input image frame at a plurality of channel granularity levels based on the plurality of statistical models, the plurality of probabilistic models including: at a first channel granularity level, a probability image from each of the S-T histogram and the aggregate histograms, wherein each of the probability images comprises a plurality of pixels each indicating a probability of a corresponding pixel in the input image being a background pixel; at a second channel granularity level higher than the first channel granularity level, compact probability images from the probability images at the first channel granularity level; merging the compact probability images based on a weighted average to form a single probability image; subsampling pixels in the single probability image; determining background pixels, based on a probability threshold value, from the subsampled single probability image; and replacing the determined background pixels with desired pixel values.

In another aspect, a computer-implemented image processing method includes: receiving, using at least one processing circuit, a plurality of image frames of a video; constructing, using at least one processing circuit, a plurality of statistical models of the plurality of image frames at a plurality of pixel granularity levels; constructing, using at least one processing circuit, a plurality of probabilistic models of an input image frame at a plurality of channel granularity levels based on the plurality of statistical models; merging at least some of the plurality of probabilistic models based on a weighted average to form a single probability image; and determining background pixels, based on a probability threshold value, from the single probability image.

In one implementation, the plurality of statistical models includes: at a first pixel granularity level, a spatio-temporal (S-T) histogram for each of the pixels from the plurality of image frames, wherein a horizontal axis of the S-T histogram represents channel value bins, and wherein a vertical axis of the S-T histogram represents counts of image frames per bin; and at a second pixel granularity level higher than the first pixel granularity level, aggregate histograms for the blue, green, and red channels, respectively, based on aggregated pixel values at a the higher pixel granularity level.

In one implementation, the plurality of probabilistic models include: at a first channel granularity level, a probability image from each of the S-T histogram and the aggregate histograms, wherein each of the probability images comprises a plurality of pixels each indicating a probability of a corresponding pixel in the input image being a background pixel; and at a second channel granularity level higher than the first channel granularity level, compact probability images from the probability images at the single-channel granularity level.

In one implementation, the compact probability images are obtained from one of a mean, a median, or a minimum operation over the probability images at the first channel granularity level for a plurality of channels, wherein the first channel granularity level is a single-channel granularity level.

In one implementation, the compact probability images include: a compact S-T probability image at the first pixel granularity level and the second channel granularity level; a compact aggregate background probability image at the second pixel granularity level across a first-order approximation of a background region and at the second channel granularity level; and a compact aggregate foreground probability image at the second pixel granularity level across a first-order approximation of a foreground region and at the second channel granularity level, wherein the compact S-T probability image is given a higher weight in the weighted average.

In one implementation, the weighted average gives a higher weight to the probabilistic models at a lower pixel granularity level.

In one implementation, the method further includes subsampling pixels in the single probability image, wherein the background pixels are determined from the subsampled single probability image.

In one implementation, the method further includes automatically replacing the determined background pixels with desired pixel values.

In one implementation, the method further includes alpha-blending the determined background pixels with foreground pixels.

In one implementation, each pixel of each of the plurality of image frames has a blue channel, a green channel, a red channel, and an alpha channel.

In one implementation, each pixel of each of the plurality of image frames has a blue channel, a green channel, and a red channel.

In one implementation, the method further includes: adding and subtracting image frames to the plurality of image frames; and updating the plurality of statistical models and the plurality of probabilistic models based on the plurality of image frames with the added and subtracted image frames.

In one implementation, the method further includes sampling one of the plurality of image frames at a probability equal to a desired statistics update frequency.

In another aspect, an image processing system is provided including at least one processing circuit configured to: receive a plurality of image frames of a video; construct a plurality of statistical models of the plurality of image frames at a plurality of pixel granularity levels; construct a plurality of probabilistic models of an input image frame at a plurality of channel granularity levels based on the plurality of statistical models; merge at least some of the plurality of probabilistic models based on a weighted average to form a single probability image; and determine background pixels, based on a probability threshold value, from the single probability image.

In one implementation, the plurality of statistical models include: at a first pixel granularity level, a spatio-temporal (S-T) histogram for each of the pixels from the plurality of image frames, wherein a first axis of the S-T histogram represents channel value bins, and wherein a second axis of the S-T histogram represents counts of image frames per bin; and at a second pixel granularity level higher than the first pixel granularity level, aggregate histograms for the blue, green, and red channels, respectively, based on aggregated pixel values at a the second pixel granularity level.

In one implementation, the plurality of probabilistic models include: at a first channel granularity level, a probability image from each of the S-T histogram and the aggregate histograms, wherein each of the probability images comprises a plurality of pixels each indicating a probability of a corresponding pixel in the input image being a background pixel; and at a second channel granularity level higher than the first channel granularity level, compact probability images from the probability images at the single-channel granularity level.

In one implementation, the compact probability images are obtained from one of a mean, a median, or a minimum operation over the probability images at the first channel granularity level for a plurality of channels.

In one implementation, the compact probability images include: a compact S-T probability image at the first pixel granularity level and the second channel granularity level; a compact aggregate background probability image at the second pixel granularity level across a first-order approximation of a background region and the second channel granularity level; and a compact aggregate foreground probability image at the second pixel granularity level across a first-order approximation of a foreground region and the second channel granularity level, wherein the compact S-T probability image is given a higher weight in the weighted average.

In one implementation, the system is configured for video chatting among a plurality of users, wherein the at least one processing circuit is included on a user side.

It should be appreciated that all combinations of the foregoing concepts and additional concepts discussed in greater detail below (provided such concepts are not mutually inconsistent) are contemplated as being part of the implementations disclosed herein. In particular, all combinations of claimed subject matter appearing at the end of this disclosure are contemplated as being part of the implementations disclosed herein. It should also be appreciated that terminology explicitly employed herein that also may appear in any disclosure incorporated by reference should be accorded a meaning most consistent with the particular concepts disclosed herein.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the described subject matter may be shown exaggerated or enlarged to facilitate an understanding of the described subject matter. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

DETAILED DESCRIPTION

Figure 1:
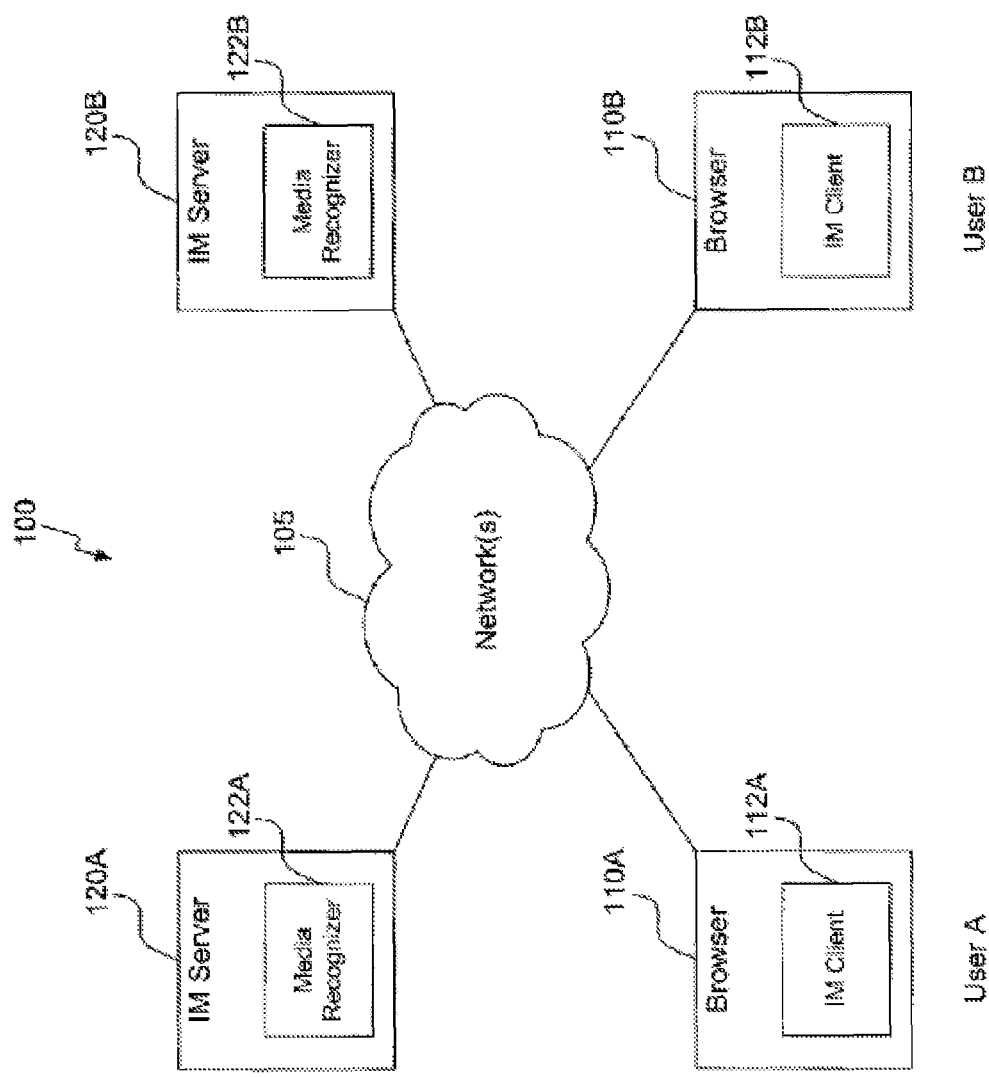
FIG. 1 is a block diagram illustrating an example messaging communication environment.

Following below are more detailed descriptions of various concepts related to, and embodiments of, methods and systems for image processing. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Recent advances in computer networking and processing make images easily accessible. One aspect of the image processing involves detection and alteration of objects and/or background of an image.

For example, in one area of application, public access of images, especially images containing human faces raises concerns about privacy. To protect the privacy of people appearing in an image, their faces may be altered to become unrecognizable to obscure their identities. To obscure a face in an image, a region containing the face can first be identified. Automatic face detection techniques can help to identity face regions when processing a large number of images. The detected face region in the image may be replaced by a replacement shape with solid color or mosaics. In an implementation, a face or object may be hidden or replaced with an "expected" background image for that region. The expected background region can be obtained from the S-T histogram pixel values with maximal probability at each pixel as described in detail below. Users viewing the modified image may not be aware that an object/face was removed.

In another area of application, video surveillance systems can be deployed at homes, office buildings, and other locations and can automatically detect moving objects with respect to the background. The detection of the moving objects may be based on frame-to-frame comparison of the video images. Digital signal processing (DSP) chips may be used in these image processing applications.

In other areas of application, such as in a video chat, it may be desirable to replace one background with an alternate background image. A background image can be manually selected, for example, by requiring the user to first move out of the video frame. In addition, when the background changes, such as when the lighting level changes, or when the video camera changes its location/angle, the background may need to be reset manually.

According to an implementation described herein, automatic segmentation of foreground and background within a video frame can be performed, and the background can be automatically determined and updated in real-time without user intervention.

Implementations disclosed herein can also be used to process images displayed on an Internet television (TV) or web TV, or with a smart TV system. In an Internet TV or web TV environment, a personal computer or a mobile device can be used to stream or download media programs over the Internet. In a smart TV system, a smart TV module (or connected TV module, hybrid TV module, etc.) can integrate a conventional TV set with the Internet, and can bring a more integrated experience to users. A user can select desired content to view on the smart TV, play games over the Internet, browse web pages, etc., and may not necessarily discern whether the content is from broadcasting, as in a conventional TV, or is from the Internet.

The smart TV may include a processing circuit configured to integrate internet connectivity with more traditional TV programming sources (e.g., received via cable, satellite, over-the-air, or other signals). The smart TV module may be physically incorporated into a TV set or may include a separate device such as a set-top box (STB), Blu-ray or other digital media player, game console, hotel TV system, or other companion devices.

A smart TV module may be configured to allow viewers to search and find videos, movies, photos and other content on the web, on a local cable TV channel, on a satellite TV channel, or stored on a local storage device. A STB or set-top unit (STU) may include an information appliance device that may contain a tuner and connect to a TV set and an external signal source, turning the signal into content which is then displayed on the TV screen or other display device.

Other applications, such as video compression, encoding/decoding, and online video downloading/viewing, can also take advantage of the implementations disclosed herein.

In the following, an video chat environment is used as an example application of the implementations disclosed herein. It should be understood that the implementations are not limited to video chatting. Those skilled in the art with access to the teachings provided herein will recognize additional modifications, applications, and embodiments within the scope thereof and additional fields in which the implementations would be of significant utility.

The emergence and development of computer networks and protocols, including the World Wide Web (or simply "the web"), now allows many remote users to communicate with one another. Different types of communication tools have been developed for the web which allow users to communicate in different ways through a browser. One popular type of communication tool is instant messaging (also called chat). Instant messaging (IM) allows users to communicate over the web in real time. A user uses a client program (called an IM client) that communicates with an instant messaging service over the web. The IM client has a graphical user-interface (GUI) that allows a user to input text and view text. With the increase of the network speed, video chat and video teleconferencing are becoming more popular.

FIG. 1 is a diagram of an example system 100 for viewing media content in instant messaging between two users A and B. System 100 may include a browser 110A coupled to an IM server 120A over one or more networks 105. Browser 110A may further include an IM client 112A. A browser 110B may also be coupled to an IM server 120B over one or more networks 105. Browser 110B may further include an IM client 112B. IM server 120A may be further coupled to IM server 120B over one or more networks 105.

Network(s) 105 can be any network or combination of networks that can carry data communication. Such network(s) 105 can include, but are not limited to, a local area network (LAN), medium area network, and/or wide area network (WAN) such as the Internet. Network(s) 105 can support protocols and technology including, but not limited to, World Wide Web protocols and/or services. Intermediate web servers, gateways or other servers may be provided between browsers 110A, 110B and IM servers 120A, 120B, and between IM servers 120A, 120B depending upon a particular application or environment.

Client browsers 110A, 110B and IM clients 112A, 112B can be implemented in software, firmware, hardware, or any combination thereof. Client browsers 110A, 110B and IM clients 112A, 112B can be implemented to run on any type of processing device including, but not limited to, a computer, workstation, distributed computing system, embedded system, stand-alone electronic device, networked device, mobile device, set-top box, television, or other type of processor or computer system. Client browsers 110A, 110B and IM clients 112A, 112B can also be used in a variety of applications in combination with instant messaging (or in instant messaging alone).

Similarly, IM servers 120A, 120B and media recognizers 122A, 122B can be implemented in software, firmware, hardware, or any combination thereof. IM servers 120A, 120B and media recognizers 122A, 122B can be implemented to run on any type of processing device including, but not limited to, a computer, workstation, distributed computing system, embedded system, stand-alone electronic device, networked device, mobile device, set-top box, television, or other type of processor or computer system. IM servers 120A, 120B and media recognizers 122A, 122B can also be used in a variety of applications in combination with instant messaging (or in instant messaging alone).

System 100 can be used is a stand-alone system or in connection with a search engine, web portal, or other web site to allow remote users to engage in instant messaging with video viewing. IM servers 120A, 120B can operate alone or in tandem with other servers, web servers, or devices and can be part of any search engine, portal, or web site.

In operation, IM server 120A may manage instant messaging with IM client 110A. IM server 120B may manage instant messaging with IM client 110B. When user A and user B begin chatting, IM clients 110A, 110B each may provide user-interfaces that can include conversation windows for users A and B to input their respective chat text and/or video images and sound. Optional presence information may also be made available so that users A and B know if they each are available to chat (or if others are available to chat).

As the users chat, IM clients 112A, 112B may pass chat messages to respective IM servers 120A, 120B. The chat messages may be forwarded between IM servers 120A, 120B, and from there, forwarded to respective IM clients 110A, 110B. Chat messages may then be displayed by IM clients 110A, 110B for users A and B to view.

Figure 2:
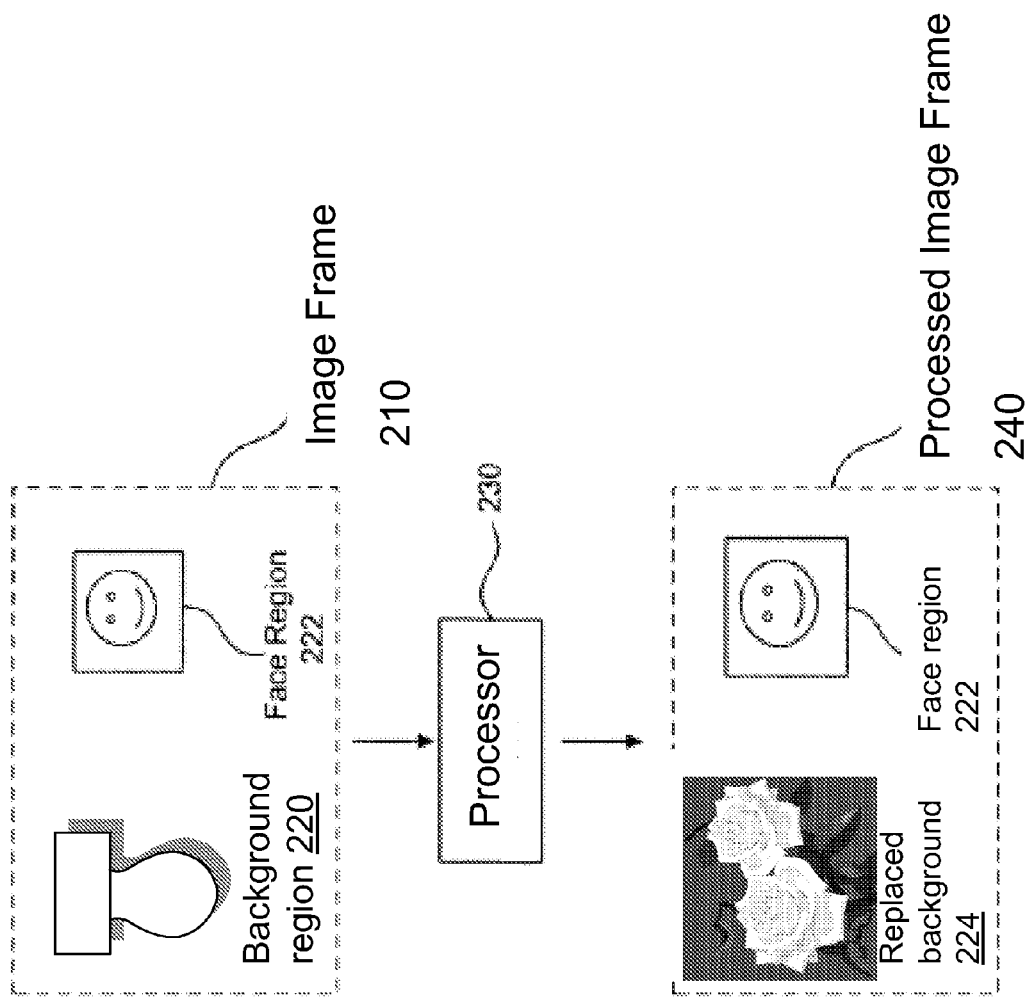
FIG. 2 illustrates processing of a video image frame to automatically replace the background according to an embodiment.

In FIG. 2, it is shown that a video image frame 210 can be captured by a video camera such as a webcam. The image frame 210 may include a background region 220 and a foreground (e.g., face) region 222. The video camera, particularly a low-cost webcam, may cause the color values in the image frame 210 to oscillate, and blur the foreground and the background.

In one implementation, the image frame 210 may be processed by a processor 230 of the user computer. The face region 222 may remain substantially the same after the processing, yet the background region 220 may be automatically replaced with a desired background 224, which may include more appealing pictures, predetermined background patterns and colors, or with different colors and brightness, etc. The processed image frame 240 with the replaced background 224 may be sent over the network for the other user(s) to view.

Figure 3:
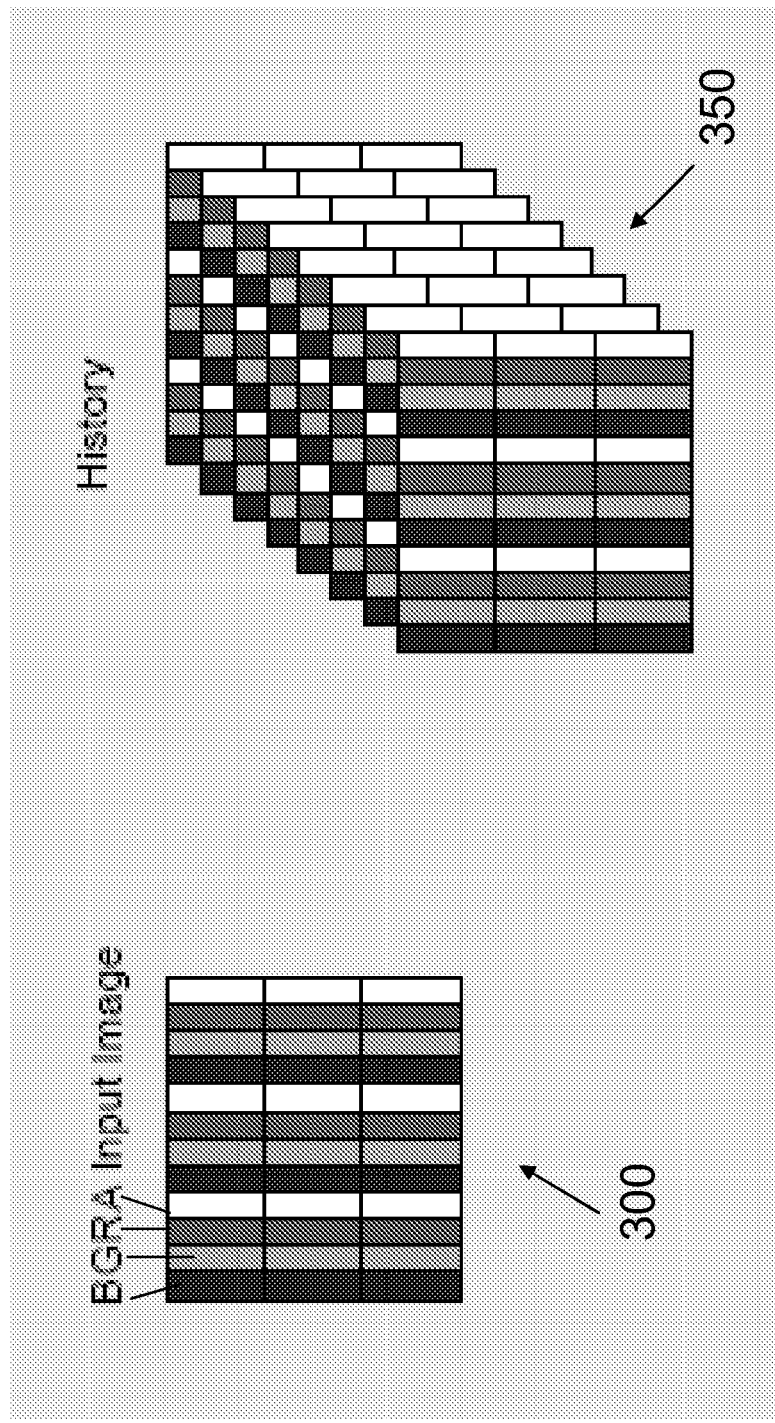
FIG. 3A illustrates a single video image frame having a plurality of channels according to an embodiment.
FIG. 3B illustrates a series of video image frames according to an embodiment.

Each image frame includes a plurality of pixels. A pixel element stores color information for the pixel, and may additionally have an "alpha channel" storing data indicating, for example, the opaqueness of the pixel. As illustrated in FIG. 3A, a video image frame 300 may include a plurality of pixels each having a blue ("B"), a green ("G"), a red ("R"), and an alpha ("A") channel. As illustrated in FIG. 3B, a video 350 may include a sequence of frames 300.

Each frame may include foreground (e.g., objects such as the face of a user), and background (e.g., objects that may be stationary) in the video scene.

In one implementation, by analyzing the frame sequence, a per-pixel background model can be built. Given a new frame, for each pixel P in the frame, a probability for P being a background pixel can be computed. If this probability is above a predetermined threshold, it is considered a background pixel, otherwise it is considered a foreground pixel.

If P is determined to be a background pixel, according to one implementation, its color value may be replaced with a color value from a predetermined background image at the corresponding pixel location.

Alternative to replacing the pixel value, the frame and the background image can be alpha blended to produce transparency effects, based on the probability of P, to thereby facilitate smoother transitions between background and foreground pixels.

In one implementation, the background model comprises a bounded history of video frames, a spatio-temporal (S-T) histogram, a foreground color aggregate histogram, a background color aggregate histogram, per-pixel probability calculations for a given frame and subsampled layers of the probability images. These components are described in more detail below.

Figure 4:
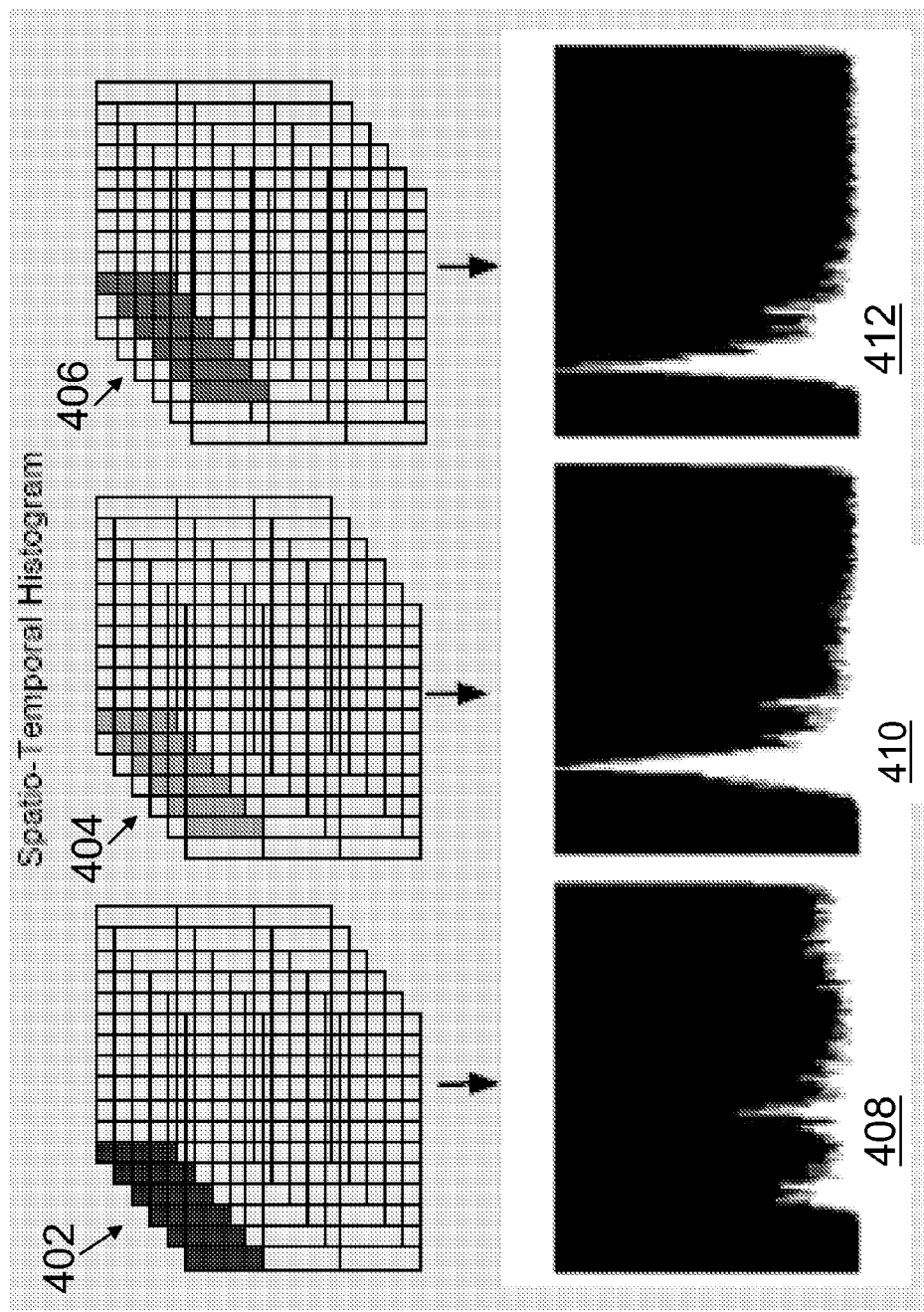
FIG. 4 illustrates spatio-temporal histograms of blue, green, and red channels according to an embodiment.

In one implementation, a plurality of S-T histograms can be computed from a history of frames 350, where each channel (blue, green, red, alpha) of each pixel has its own histogram. In an example as illustrated in FIG. 4, histories of blue channel 402, green channel 404, and red channel 406 of the pixel in the upper left corner of the frame can be used to construct their respective histograms 408, 410, and 412. It is noted that the histograms shown in the lower portion of FIG. 4 are for illustration purpose only, and do not necessarily true histograms computed from image frames 402, 404, 406 shown in the upper portion of FIG. 4.

In one example, a number of N=200 frames are used to build the histograms. In the histograms, a first axis (e.g., the horizontal axis) represents the bins of channel values, and a second axis (e.g., the vertical axis) represents the counts of frames per bin The bins can have different resolutions. For example, for a channel value range of 0-255, the values can be binned with a resolution of 1 unit value, resulting 256 bins on the horizontal axis. In another example, the channel values can be binned with a resolution of 8 unit values, resulting in 32 bins on the horizontal axis. Aggregated histograms (as described in detail below) may have much larger bins than the S-T histograms. For example, the bins can be represented by 64-bit unsigned integers.

In a first order of approximation, the pixels contributing to the peaks in the histograms 408, 410, and 412 may be considered background pixels, because their values remain substantially the same in a large number frames, indicating a lack of motion. As described in detail below, whether a pixel is considered to be a background pixel can be described probabilistically based on the histograms. The BGR channels can be combined, for example by taking the mean of the three probabilities obtained from the three histograms. Alternatively, a minimum, or a second lowest value, or other statistical methods can be used to reduce the three channel values to a single pixel value for comparison with a probability threshold.

An array of histograms can thus be built, and may be stored in the user computer's memory. A BGRA video frame of a width W and a height H can thus have W*H*4 histograms. In some other implementations, the alpha channel is not stored, and the BGR video frame would have W*H*3 histograms. Video frames using color channels other than BGR channels can also be adopted.

These S-T histograms may be considered a first layer of statistical models of the series of image frames at a first pixel granularity level, e.g., single-pixel granularity level because there is no aggregation in the physical dimensions across pixels.

Image operations including "add" and "subtract" can be employed in incorporating or removing an image from an S-T histogram. To add (subtract) an image to (from) the S-T histogram, for each channel value in each pixel and each corresponding histogram, the histogram bin index can be computed by dividing the channel value by the number of bins and incrementing (decrementing) the corresponding bin of the histogram.

The subtraction of data allows historical data substantially different from the present values to be removed from the statistics, thereby removing bias caused by an event during the history, such as when the video camera is moved. Without subtracting the data associated with an old camera position/angle, a permanent residue or bias may be included in the processed images. One can also add (subtract) to a counter of the number of images incorporated in the S-T histogram.

A "probability image" can be obtained by computing a per-channel per-pixel probability of an input image given an S-T histogram. Each channel value may be divided by the number of bins to obtain the bin index in the corresponding histogram. The probability of that channel is then the current counter value of that bin divided by the number of frames incorporated into the S-T histogram. The probability image obtained from the S-T histogram includes probabilistic information of the background at the single-pixel granularity level. In addition, there is no channel (color) aggregation in this probability image, and thus it may be considered as a first layer of probabilistic models at a first channel granularity level (e.g., single-channel granularity level).

Probabilistic models at other layers such as at higher channel granularity levels can be obtained by aggregating the probability images across multiple channels (e.g., colors). For example, a "compact S-T probability image" may be obtained by computing the probability value per pixel from the mean of the blue, green, and red channel probability image values of the corresponding pixel in the probability image. Alternatively, the compact S-T probability image may use the minimum or median operations instead of the mean operation for a more conservative estimate of the compact per-pixel probability. The compact S-T probability image includes probabilistic information of the background at the single-pixel granularity level and at a higher channel granularity level (e.g., with aggregated colors).

Figure 5:
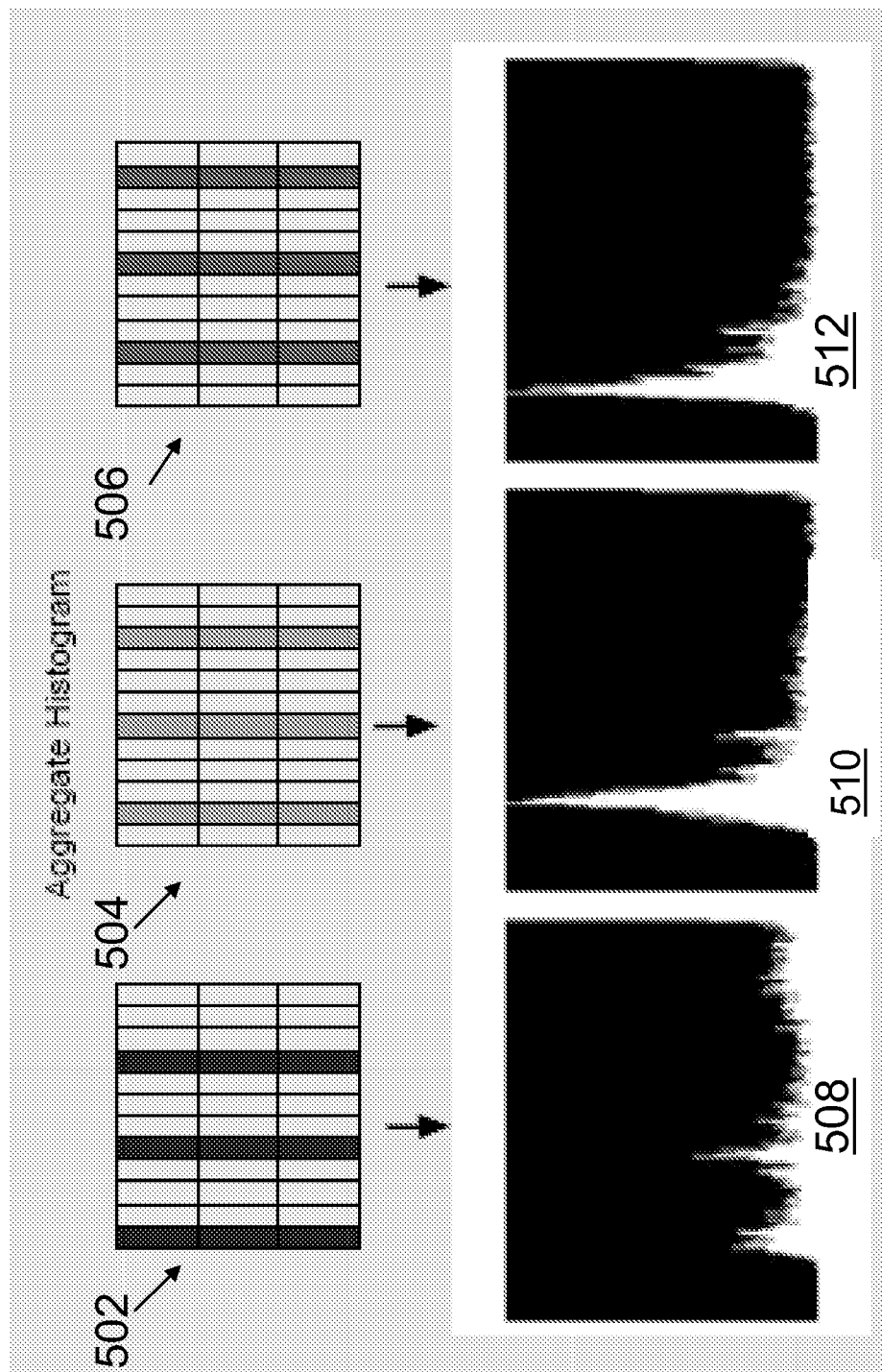
FIG. 5 illustrates aggregate histograms of blue, green, and red channels according to an embodiment.

Referring to FIG. 5, for all the pixels within the image, the blue channels 502, green channels 504, and red channels 506 can have their values aggregated, to construct three aggregated histograms (AHs) 508, 510, 512 for the entire image. These AHs are at the highest pixel granularity level as the pixel values are aggregated across the whole image frame. It is noted that the histograms shown in the lower portion of FIG. 5 are for illustration purpose only, and do not necessarily true histograms computed from image frames 502, 504, 506 shown in the upper portion of FIG. 5.

In some implementations, AHs can be segmented as background AHs and foreground AHs, which are at a pixel granularity level lower than the AHs across the whole image frame, but higher than the single-pixel granularity level of the S-T histograms. The background pixels in an input image can be identified, in a first-order approximation, by comparing the pixels in the corresponding compact probability image described with a probability threshold. The background AHs and foreground AHs can be updated on a frame-by-frame basis from the most recent compact probability image as computed from the current S-T histogram.

A Boolean operation can be employed to identify the background pixels. For example, if the pixel values are above the threshold, these pixels may be considered background pixels and used to construct the background AHs. For each pixel in the input image with corresponding compact probability image probability pixel values above the probability threshold if the Boolean is "true" (or below the threshold if the Boolean is "false"), each channel value may be divided by the number of bins in the histogram to compute the bin index, and incrementing (decrementing) the corresponding bin of the respective blue, green or red histogram to obtain the background (foreground) AHs. One can also add (subtract) the number of pixels above (or below if the Boolean is false) the threshold to the total pixel count.

Although at a higher pixel granularity level, these background and foreground AHs are still at a single-channel granularity level because there is no aggregation across channels.

A "compact aggregate probability image" operation can be performed by computing the mean (alternatively, minimum or median) of the channel probability values for each pixel in an input image given the per-channel histograms and the total number of pixels added to the aggregate histogram. The compact aggregate probability image includes probabilistic information of the background at a higher pixel granularity (e.g., global) level.

In some other implementations, the aggregation of pixels may be selected based on geometrical locations. For example, because of the corner portions of an image are more likely to be background rather than foreground, pixels at the corner portions can be grouped together and treated differently from pixels at other locations. These pixels may have very high probabilities of being background pixels and, if it is almost certain that they are background pixels, then they do not have to be included in the more complex algorithms described above. In an implementation, selected pixel locations (e.g., based on geographical locations in the image, or based on an initial background manually set or input by the user) in the image can be used to generate a prior knowledge background probability, which then may be combined with the compact probability image to bias the pixel background probability for better background identification and/or reduced computation. This combination may be a weighted average or a conditional probability calculation.

A plurality layers of statistical models and probabilistic models can be constructed for multiple pixel granularity levels (ranging from single-pixel granularity level to global level across all pixels) and channel granularity levels (ranging from single-channel granularity level to a level aggregating over all channels). A combined consideration of the different layers of models can improve the quality of the background identified and reduce the computational requirement in the image processing.

During the image processing, a "compact S-T probability image" can be computed using the S-T histogram, and two "compact aggregate probability images" can be computed using foreground and background AHs. All three compact probability images each may have one probability value per pixel.

A single "compact probability image" can be defined as a heuristic merging of these probability images to form a single probability image. A weight can be assigned to each probability image, and a sum of these weights can be computed. The value of each pixel in the resulting "compact probability image" may be computed by taking the corresponding probability value in the three input probability images, multiplying those values by their respective weights, taking the sum and dividing by the sum of the weights.

In one example, let $W_s$, $W_f$, $W_b$, $P_s$, $P_f$ and $P_b$ be the weights and probability values of a pixel from the S-T, aggregate foreground, and aggregate background compact probability images, respectively. The resulting probability can then be calculated as $(W_s*P_s+W_f*(1.0-P_f)+W_b*P_b)/(W_s+W_f+W_b)$.

In one implementation, a higher weight can be given to the probabilistic models at a lower pixel granularity level. For example, "compact S-T probability image" may be weighted higher than the foreground and background "compact aggregate probability images."

A frame in the video sequence may be chosen to be included in the history of frames at random, with a probability equal to the desired update frequency. This update frequency can be adjusted for the purpose of statistical sampling. The frequency of the S-T histogram updates may be different from that for the AH updates. In one example, the AHs an be updated for every frame, and the S-T histograms can be updated less frequently. As such, camera frequency error may be avoided, and computational power requirement may be reduced.

In one example, a frame sample probability of 0.15 may be chosen when processing a video of 30 frames per second. This may result in an average sampling of 30*0.15=4.5 frames per second. The most recent N randomly sampled frames comprise the history of frames in the background model. For an N=200, it may result in 200/(30*0.15)=44.4 seconds of history.

These parameters are for illustration purposes only, and can be adjusted to achieve the desired results. When a new frame is added to the background model, the S-T histogram may be updated. When the history of video frames is full, the oldest video frame may be subtracted from the S-T histogram and removed from the history, before the new frame is added to the S-T histogram and history. For improved efficiency, caching and reusing frame buffers may be adopted.

When determining the final background probability value of a pixel, the background probability of the surrounding pixels may be considered. To achieve this, the "compact probability image" can be subsampled twice, in a fashion similar to an "image pyramid."

In one example, a four-pixel square in the base input image layer may reduce to one pixel in the first subsampling, where the value of the pixel may be the average of the four source pixels. The second subsample can use four source pixels from the first subsample. The final background probability of a pixel can be computed by considering a heuristic weighted average of the three probability image layers with coarser layers having lower weights. This allows the spatial smoothing of the replaced background pixels, and can be useful when one pixel is volatile, but those around it are not.

Variations in the combinations of the above procedures can be made with varying degrees of success. In one implementation, simply using the S-T histogram and history of frames alone may give mediocre results. A less memory-intensive approach, which may give decent results under certain conditions, is to not retain a history of frames and not subtract old frames from the S-T histogram. However, if the camera moves or there is a global illumination change, it may take a very long time to recover, if at all.

Alternatives to the S-T histogram may include any probabilistic models capable of incrementally adding and removing samples. This includes a Gaussian model (normal distribution) where the mean of a channel value is computed by maintaining a running sum of the channel values and variation is computed by maintaining a running sum of the square of the channel values.

Other subsampling methods may be used, for example through any regional probability analysis adjacent a pixel. This can be computed by iterations of every region surrounding a pixel.

By selecting different parameters such as the threshold in the above descriptions, different properties can be obtained from the images. Changing the parameters on the other hand may influence the stability of the background model and the flexibility to change, two competing goals.

Figure 6:
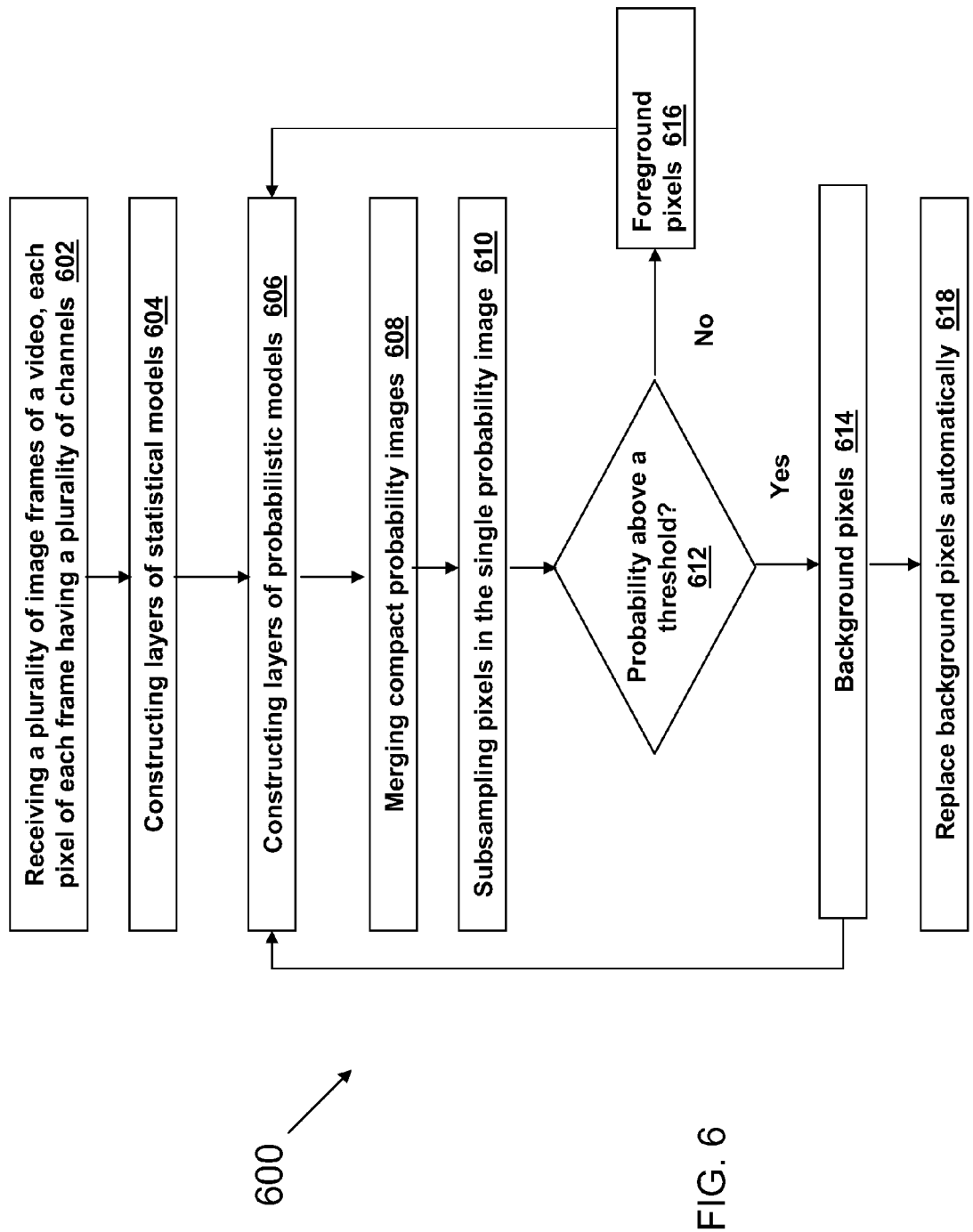
FIG. 6 is a flowchart illustrating an example of method of determining background pixels according to an embodiment.

FIG. 6 is a flowchart illustrating an example method 600 of video image processing according to one implementation.

In an operation 602, the user computer's processor may receive a plurality of image frames of a video, each pixel of each frame having a plurality of channels such as a blue channel, a green channel, a red channel, and an alpha channel.

In an operation 604, a plurality of statistical models of the plurality of image frames are constructed at a plurality of "layers," e.g., pixel granularity levels.

For example, the plurality of statistical models may include, at a single-pixel granularity level, an S-T histogram for each of the pixels from the plurality of image frames, wherein a horizontal axis of the S-T histogram represents channel value bins, and wherein a vertical axis of the S-T histogram represents counts of image frames per bin.

At a higher pixel granularity level, the statistical models may include, for example, aggregate histograms for the blue, green, and red channels, respectively, based on aggregated pixel values at a the higher pixel granularity level. In one example, the higher pixel granularity level is at a global level, taking into account of all pixels in an image frame at a specified channel.

In an operation 606, a plurality of probabilistic models of an input image frame may be constructed at a plurality of "layers,", e.g., channel granularity levels.

For example, the plurality of probabilistic models may include, at a single-channel granularity level, a probability image from each of the S-T histogram and the aggregate histograms, wherein each of the probability images comprises a plurality of pixels each indicating a probability of a corresponding pixel in the input image being a background pixel.

At a higher layer or channel granularity level, compact probability images may be constructed from the probability images at the single-channel granularity level.

In an operation 608, the compact probability images may be merged based on a weighted average to form a single probability image.

In an operation 610, pixels in the single probability image may be subsampled to smooth out those more volatile pixels.

In an operation 612, background pixels in an input image can be determined by comparing the corresponding subsampled single probability image pixels with a probability threshold value.

If the probability is higher than the predetermined threshold value, then the pixel is determined to be a background pixel in an operation 614. Otherwise in an operation 616 the pixel is determined to be a foreground pixel.

The background as determined from the above operations can be iteratively computed multiple times for improved quality. For example, the background and foreground determined from operations 614 and 616 can be fed into the operation 606 of constructing probabilistic models. In one example, the background/foreground can be iteratively computed for each pixel in a new frame. The foreground and background AHs can be updated by sampling the frame (e.g., randomly), or include all the pixels in the frame.

In an operation 618, the background pixels can be automatically replaced with desired pixel values without user intervention.

Figure 7:
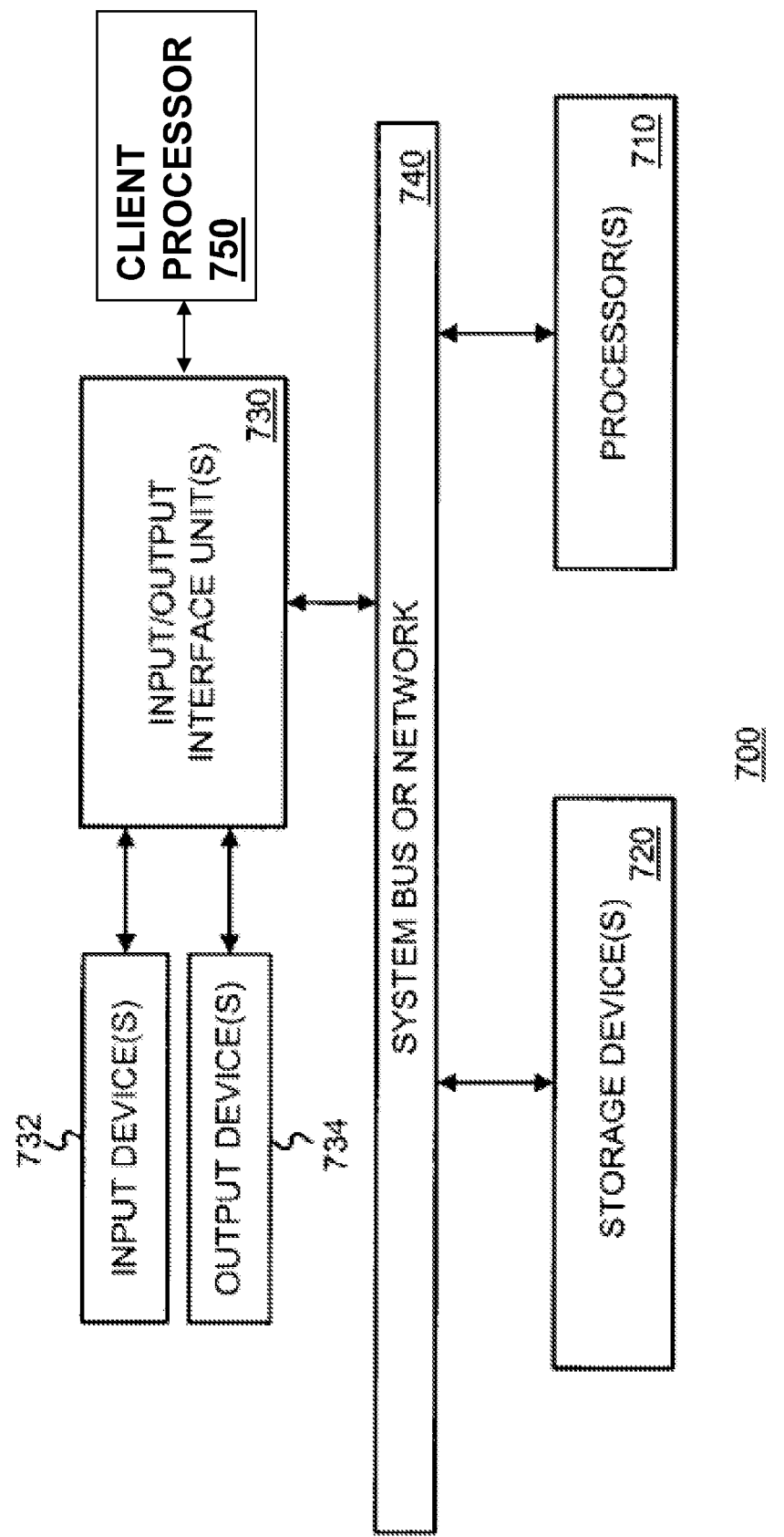
FIG. 7 is a block diagram illustrating a system that can be used to perform at least some of the various operations according to an embodiment.

FIG. 7 is a block diagram illustrating a system that can be used to perform at least some of the various operations described above. The processor(s) 710 may be server processor(s), and may include one or more microprocessors or processing circuits. The bus or network 740 may be a system bus, or the Internet. The storage device 720 may include system memory, such a read only memory (ROM) and/or random access memory (RAM). The storage device 720 can include any suitable type of storage including, for example, a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or any other type of storage medium.

A user may enter commands and information into a user terminal such as a smart TV module, a personal computer, or a mobile device, through input device 732, such as a keyboard and pointing device (e.g., a mouse), or a video camera. Other input devices such as a microphone, a sensor, a touch input interface, a joystick, a game pad, a satellite dish, a scanner, or the like, may also (or alternatively) be included. These and other input devices can be connected, through an appropriate interface 730, to the network (e.g., the Internet) or a system bus 740, and to one or more client processor(s) 750, such as the processor of the user's personal computer. In accordance with implementations disclosed herein, the image processing can be performed on the client processor(s) 750, and the processing power and memory consumption can be confined substantially to the client side.

In one implementation, the user's personal computer includes non-transitory computer-readable medium having instructions stored thereon, which, when executed by the processor(s) 750, cause the processor(s) 750 to process the video images received from the input device 732 according to the methods described above. Video images with automatically-replaced background may be sent via the network 740 to other user terminals.

The output device 734 may include a monitor or other types of display devices, which can be connected to the network 740 and/or the client processor(s) 750 via an appropriate interface. In addition (or instead of) the monitor, the user terminal may include other (peripheral) output devices (not shown), such as speakers and printers for example. In some cases, output device 734 can include a component for providing one or more of a visual output, a haptic output, or an audio output.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A computer-implemented image processing method, comprising:
   receiving, using at least one processing circuit, a plurality of image frames of a video;
   constructing, using at least one processing circuit, a plurality of statistical models of the plurality of image frames at a plurality of pixel granularity levels;
   constructing, using at least one processing circuit, a plurality of probabilistic models of an input image frame at a plurality of channel granularity levels based on the plurality of statistical models;
   merging at least some of the plurality of probabilistic models based on a weighted average to form a single probability image; and
   determining background pixels, based on a probability threshold value, from the single probability image, wherein the plurality of statistical models comprise spatio-temporal (S-T) histogram for each of the pixels from the plurality of image frames, wherein a horizontal axis of the S-T histogram represents channel value bins, and wherein a vertical axis of the S-T histogram represents counts of image frames per bin.

2. The method of claim 1, wherein the plurality of probabilistic models comprise:
   a probability image from each of the S-T histogram, wherein each of the probability images comprises a plurality of pixels each indicating a probability of a corresponding pixel in the input image being a background pixel; and
   compact probability images from the probability images.

3. The method of claim 2, wherein the compact probability images are obtained from one of a mean, a median, or a minimum operation over the probability images.

4. The method of claim 2, wherein the compact probability images include:
   a compact S-T probability image;
   a compact aggregate background probability image across a first-order approximation of a background region; and
   a compact aggregate foreground probability image across a first-order approximation of a foreground region,
   wherein the compact S-T probability image is given a higher weight in the weighted average.

5. The method of claim 1, wherein the weighted average gives a higher weight to the probabilistic models at a lower pixel granularity level.

6. The method of claim 1, further comprising:
   subsampling pixels in the single probability image,
   wherein the background pixels are determined from the subsampled single probability image.

7. The method of claim 1, further comprising automatically replacing the determined background pixels with desired pixel values.

8. The method of claim 1, further comprising alpha-blending the determined background pixels with foreground pixels.

9. The method of claim 1, wherein each pixel of each of the plurality of image frames has a blue channel, a green channel, a red channel, and an alpha channel.

10. The method of claim 1, wherein each pixel of each of the plurality of image frames has a blue channel, a green channel, and a red channel.

11. The method of claim 1, further comprising:
    adding and subtracting image frames to the plurality of image frames; and
    updating the plurality of statistical models and the plurality of probabilistic models based on the plurality of image frames with the added and subtracted image frames.

12. The method of claim 1, further comprising:
sampling one of the plurality of image frames at a probability equal to a desired statistics update frequency.

13. An image processing system comprising at least one processing circuit configured to:
receive a plurality of image frames of a video;
construct a plurality of statistical models of the plurality of image frames at a plurality of pixel granularity levels;
construct a plurality of probabilistic models of an input image frame at a plurality of channel granularity levels based on the plurality of statistical models;
merge at least some of the plurality of probabilistic models based on a weighted average to form a single probability image; and
determine background pixels, based on a probability threshold value, from the single probability image wherein the plurality of statistical models comprise spatio-temporal (S-T) histogram for each of the pixels from the plurality of image frames, wherein a horizontal axis of the S-T histogram represents channel value bins, and wherein a vertical axis of the S-T histogram represents counts of image frames per bin.

* * * * *